United States Patent [19]
Rautenbach

[11] Patent Number: 5,287,682
[45] Date of Patent: Feb. 22, 1994

[54] MOWER

[76] Inventor: George F. Rautenbach, 257 Nelsonia, Vereeniging District, Transvaal, South Africa

[21] Appl. No.: 944,217

[22] Filed: Sep. 11, 1992

[30] Foreign Application Priority Data

Sep. 13, 1991 [ZA] South Africa ............ 91/7316

[51] Int. Cl.⁵ ............................................. A01D 55/00
[52] U.S. Cl. ............................................. 56/6; 56/13.6
[58] Field of Search ...................... 56/6, 7, 13.6, 192

[56] References Cited

U.S. PATENT DOCUMENTS

| | | | |
|---|---|---|---|
| 4,601,162 | 7/1986 | Wessel | 56/6 X |
| 4,896,493 | 1/1990 | Neuerburg | 56/6 x |
| 4,974,399 | 12/1990 | Haberkorn | 56/6 |
| 4,984,418 | 1/1991 | Lely et al. | 56/6 X |

Primary Examiner—Thuy M. Bui
Attorney, Agent, or Firm—Body, Vickers & Daniels

[57] ABSTRACT

The invention provides a tractor-drawn mower for use in harvesting a crop. The mower comprises a frame and at least two rotatable cutting elements for cutting the crop mounted rotatably on the frame. The cutting elements have non-overlapping loci of cutting movement and are arranged on the mower to cut in use overlapping swathes of crop material. Preferably, the cutting elements are provided at or towards the periphery of a plurality of cutting discs which are spaced along a substantially common axis on the mower frame.

12 Claims, 4 Drawing Sheets

MOWER

BACKGROUND OF THE INVENTION

This invention relates to a mower for use in harvesting crops.

One type of conventional tractor-drawn mower comprises a series of cutting discs mounted rotatably to the chassis of the mower in a row at right angles to the direction of movement of the mower as it advances through the crop. The discs are usually provided with peripheral cutting elements with the circular cutting paths of such elements on adjacent discs usually being arranged to overlap so that the discs cut a complete swathe of grass between them without leaving a ridge of unmowed grass behind the mower. Complicated and expensive synchronisation means or gearboxes have thus been required on such mowers to ensure that overlapping elements do not come into contact with each other as they rotate about their respective axes. Clearly, much damage would be caused to the mowing machine should two cutting elements collide with each other. However, even when synchronised, it is possible for one of the rotating discs to hit an obstacle, such as a small rock or boulder for example, and to be thrown out of synchronisation which may lead to even further damage of the cutting elements or mower, and also may require the mower operator to stop the mowing operation and re-synchronise the disc. This of course wastes time and is a laborious process.

Previous attempts to avoid the necessity of having synchronisation means have included arranging the cutting discs at different heights so that the cutting elements disposed on the periphery of the disc rotate in different planes. However, these methods suffer the disadvantage that the crop or grass is not cut uniformly even and the lower elements tend to cause unsightly "scalping" when coming into contact with slight undulations or contour differences in the field. In commercial crop harvesting applications where profit margins are important, many farmers consider a large cutting height discrepancy to be unacceptable as this leads to crop wastage and loss of profits.

Another type of conventional machine for cutting grasses recreational areas and the like employs rotating blades or "slashers" to cut through the grass. Such machines clearly have no application in harvesting applications where the crop is sought to be recovered in a more or less undamaged state. Indeed, in such conventional grass cutting machines it is only by coming into contact with the rotating blades several times that the grass is cut finely and thrown clear of the machine. In crop harvesting applications, it is exactly the opposite effect which is required. Ideally, the stalks of the crop which is to be harvested should be cut only once so that a following bailing machine is able to lift and recover the cut crop.

Various types of gang mowers have also been proposed which employ a plurality of cutting blades which are arranged in several parallel rows which extend at right angles to the direction of advancement of the gang mower through the grass. Once again, these types of machine are not suitable in harvesting applications as the front row of cutting blades throws cut material into the path of the rearward row of cutting blades which only serves to cut the mown material more finely. In harvesting applications, the aim is to prevent further damage to the cut material as far as possible.

Many commercial farmers employ tractors for drawing large agricultural implements and machinery around their farms. It would therefore be advantageous when designing a mower to design a machine which can be drawn behind a tractor and is able to draw power from the tractor.

The present invention seeks to address these requirements.

SUMMARY OF THE INVENTION

According to the invention there is provided a tractor-drawn mower for use in harvesting a crop, the mower comprising a frame, at least two rotatable cutting elements for cutting the crop mounted rotatably on the frame, the cutting elements having non-overlapping loci of cutting movement and being arranged on the mower to cut in use overlapping swathes of crop material.

The mover preferably comprises at least two cutting discs mounted rotatably on the mower frame with the cutting elements being provided at or towards the periphery of the discs. The cutting discs are preferably non-synchronised cutting disc with the cutting elements preferably being rotatably mounted on the discs.

The mower according to the invention is preferably a drum cutter mower which each cutting disc forming part of a drum cutting head and having an associated skid disc mounted rotatably beneath the cutting disc for supporting the mower. Typically three such cutting heads are provided in a single row on the mower frame.

The mower frame preferably comprises a unitary box section arm which rotatably supports each cutting disc. The arm is preferably adapted to be suspended from the hitching mount of the tractor and to extend therefrom in use to one side of the tractor so that the mower is not drawn through the crop directly behind the tractor. The cutting heads are preferably spaced along the longitudinal axis of the box section arm.

In a preferred version of the invention, the mower frame comprises hinge means so that the arm can be swung to an inoperative position where it is drawn directly behind the tractor, and an operative position in which the arm extends laterally of the tractor so that the cutting heads are drawn on an inclined substantially common axis through the crop thereby to cut overlapping swathes of crop material.

The mower is preferably provided with auxiliary power take-off means so that the mower can draw power from the tractor.

More preferably, the mower comprises drive means for rotating the cutting elements in the form of an arrangement of V-belts and pulleys.

BRIEF DESCRIPTION OF THE DRAWINGS

The invention will now be described in more detail by way of example only with reference to the accompanying drawings, in which.

DESCRIPTION OF PREFERRED EMBODIMENTS

Figure 1:
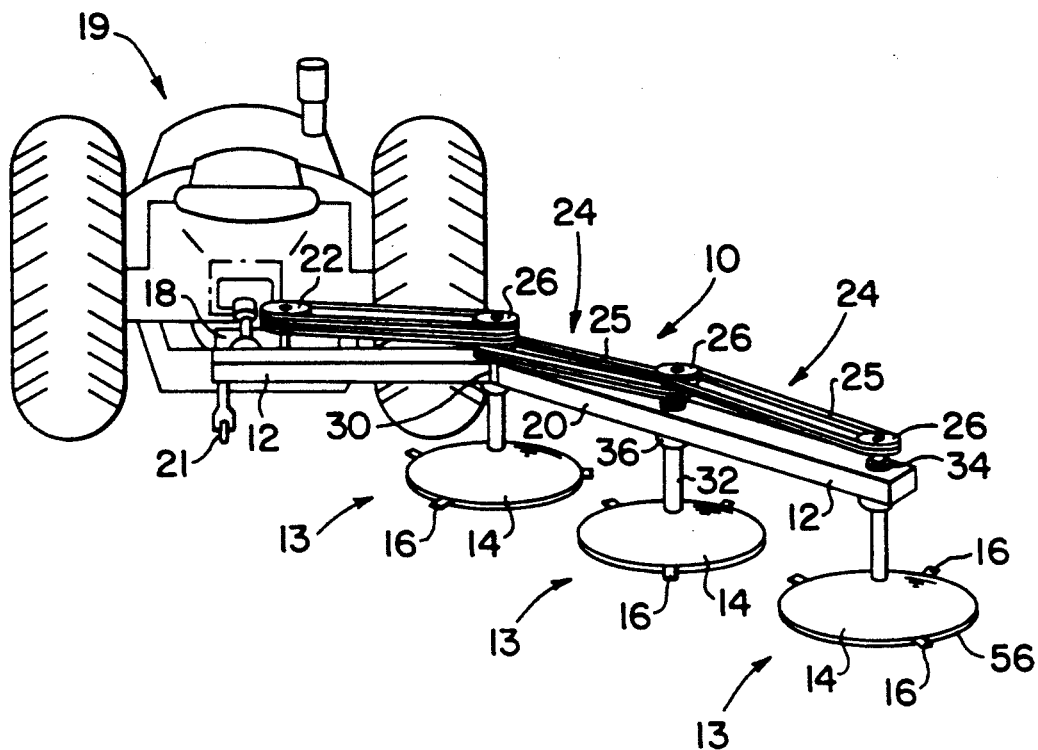
FIG. 1 shows a rear pictorial view of a mower according to the invention in place behind a tractor.

The tractor-drawn mower 10 shown in the accompanying drawings is suited to cutting crops in harvesting applications. It comprises a frame 12 which rotatably supports three high speed drum cutting heads 13. Each cutting head comprises a cutting disc 14. Cutting elements 16 are provided about the periphery of each disc 14. At the end of the frame, mounting means, shown generally at 18, are provided for mounting the mower to the hitching mount of the tractor 19 in a conventional manner. As will be seen in the drawings, the cutting heads 13 are arranged in a single row on the mower frame and are spaced evenly along the longitudinal axis of a unitary box section arm or beam 20 of the frame which is inclined to the direction of movement or advancement of the mower through the vegetation which is to be mowed.

At the same end of the frame as the mounting means 18, a jockey wheel 21 is provided which helps to support this end of the frame above the ground. Provided adjacent to the mounting means 18, auxiliary power take-off means in the form of a power take-off pulley 22 is provided by means of which drive means, which are generally indicated at 24, can transmit power from the tractor 19 through to each of the cutting discs 14. The drive means 24 in this embodiment of the invention comprise an arrangement of V-belts 25 and pulleys 26. The V-belts and pulleys allow rotational slip of one cutting disc relative to another.

Figure 2:
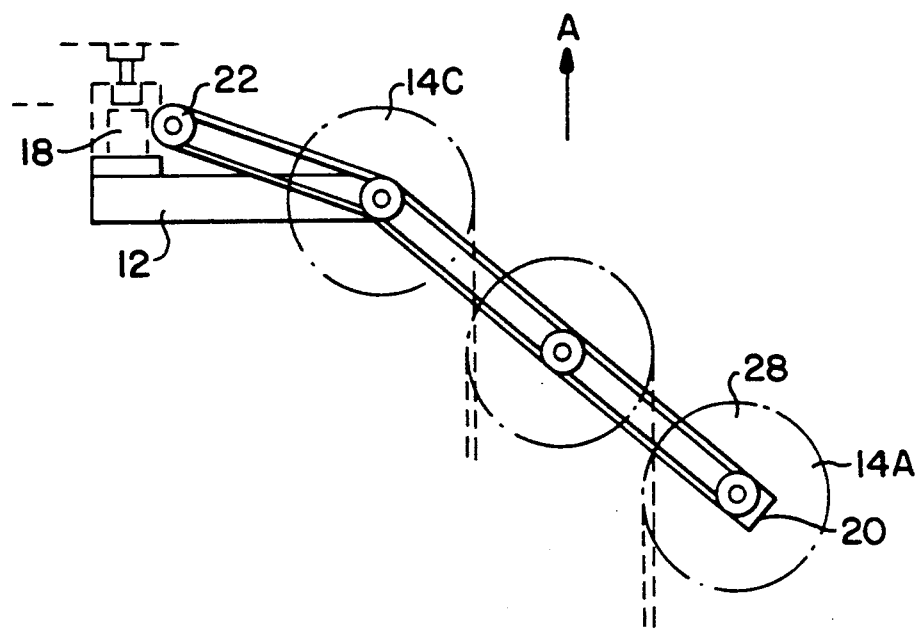
FIG. 2 shows a plan view of the mower shown in FIG. 1.

Reference is now made to FIG. 2 in which the loci of movement of the cutting elements 16 on the periphery of the cutting discs 14 are shown in dotted outline at 28. It will be seen in this view that the loci of movement 28 do not overlap in the direction of the longitudinal axis of the arm 20 of the frame. The spaced configuration of the discs means that there is no possibility of the cutting elements 16 colliding with each other and there is consequently no requirement for maintaining synchronisation of the cutting discs, and the necessity of having complicated and expensive gear boxes or other synchronisation means is avoided.

The direction of advancement of the mower through the crop to be mowed is indicated by arrow A in this Figure. It will be appreciated that if the mower is towed in this direction the cutting disc 14 and the associated cutting elements 16 will nevertheless cut complete swathes of material between the outer disc 14A and the inner disc 14C since the loci of movement of the cutting elements 16 overlap in the direction of arrow A. Thus, a complete swathe of material can be cut between these discs without the need for complicated and expensive synchronisation means which would otherwise have to ensure that the rotating cutting elements 16 do not collide with each other. Of course, more than three discs could be provided, and the invention also contemplates the use of such a mower 10 on either side of a tractor.

The mower 10 also has a safety feature which prevents damage to the mower should the inclined arm 20 of the mower come to contact with an obstacle. A hinged joint 30 is provided on the frame of the mower and allows the inclined arm 20 to swing rearwardly behind the tractor should this arm encounter an obstacle. The position of this hinge nevertheless allows the continued transmission of power through to the cutting discs from the power-take off pulley 22. The hinge also allows the mower to be swung to an inoperative position where it is drawn directly behind the tractor, and an operative position in which the arm extends laterally of the tractor so that the cutting heads are drawn on an inclined substantially common axis as described above through the crop thereby cutting overlapping swathes of crop material. In this operative position, the arm extends from the hitching mount of the tractor to one side of the tractor so that the mower is not drawn through the crop directly behind the tractor. Accordingly, damage to the crop is minimised.

Figure 3:
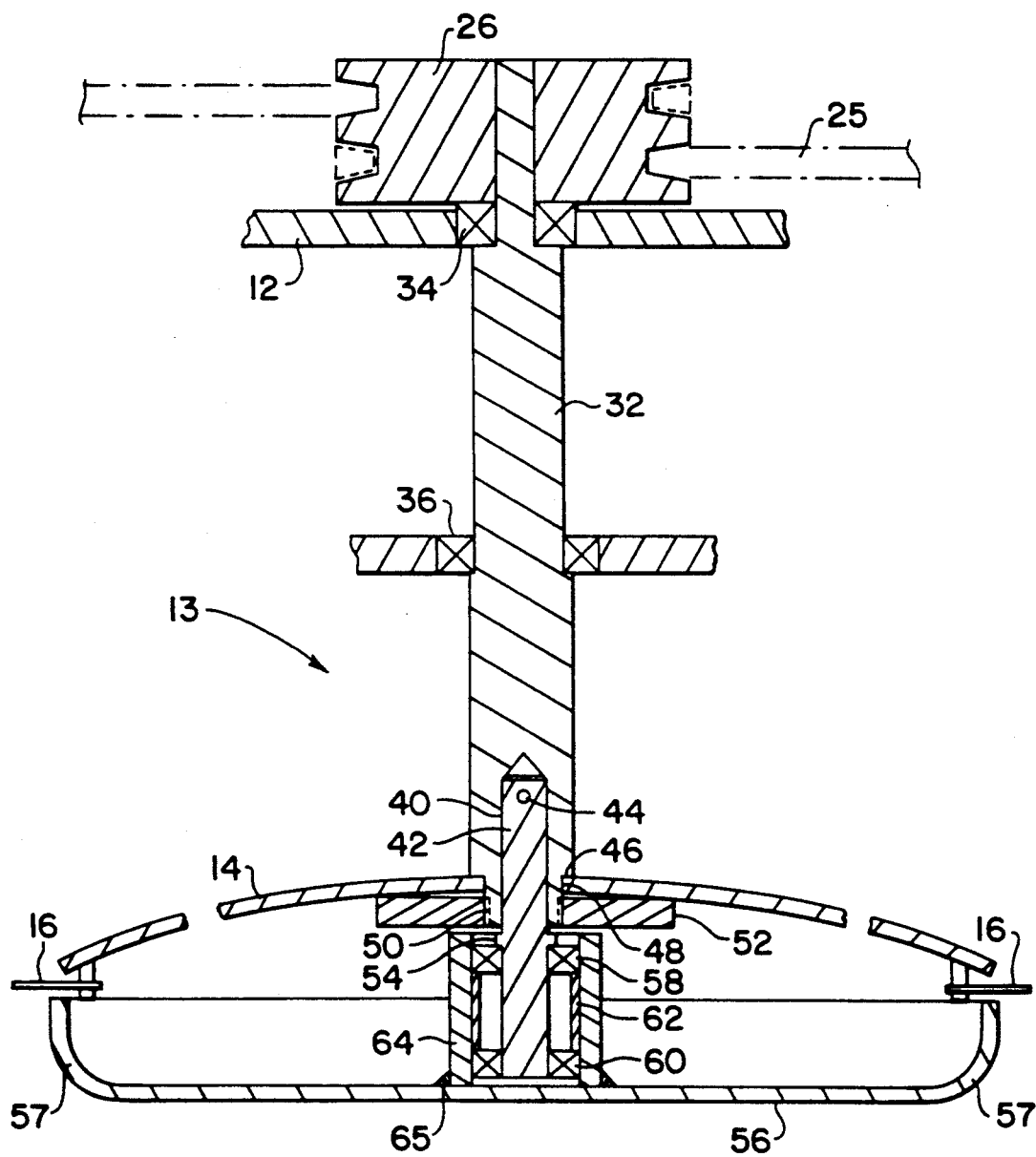
FIG. 3 shows a sectional view of a drum cutting head of the mower shown in FIG. 1.

Reference is now made to FIG. 3 which shows a sectional view of a drum cutting head of the mower shown in FIGS. 1 and 2. The high speed cutting discs 14 are each turned by means of a rotating shaft 32. The cutting elements 16 are mounted rotatably at or towards the periphery of the cutting discs 14 and can therefore swing freely to clear an obstacle. The shaft 32 is supported rotatably in the box section arm 20 by means of bearings 34 and 36. A pulley 26 for a V-belt 25 is shown at the top of the shaft and is fast to the shaft 32. The lower end of the shaft 32 is provided with an internal bore 40 in which a stub shaft 42 is rotatably supported. The stub shaft 42 is held inside the bore 40 by means of a retaining pin 44, or by a grub screw.

The lower end of the shaft 32 is stepped to define a shoulder at 46. Below the shoulder 46 a square shaft portion 48 is provided which engages in a complementally shaped square recess provided in the centre of the cutting disc 14. Immediately below the square section 48, the shaft is threaded at 50 with the threads in use engaging with a complementally threaded flange nut 52 which can be locked up against the underside of the cutting disc 14 to hold the cutting disc securely in place. Torque is thus transmitted to the associated cutting disc 14 by means of the square shaft section 48.

Figure 4:
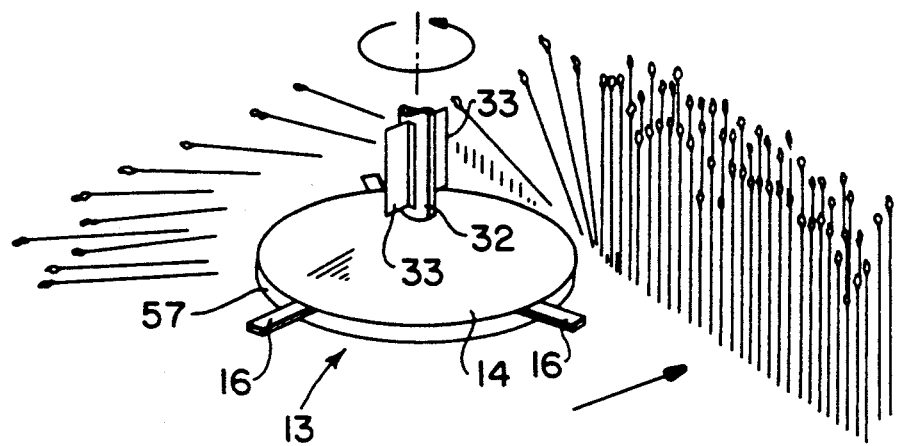
FIG. 4 shows a schematic view of a drum cutting head advancing through a crop.
Figure 5:
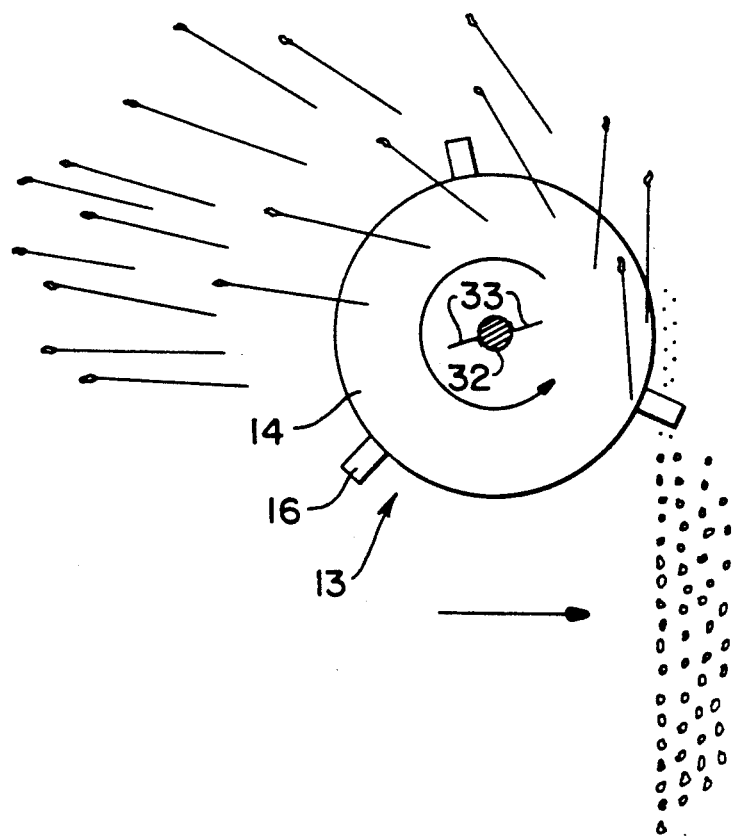
FIG. 5 shows a plan view of the cutting head shown in FIG. 4.

The stub shaft 42 depends from the lower end of the rotating shaft 32 and is provided with a centrally disposed circumferential rib or bead 54. The stub shaft, which is mounted rotatably to the bottom of the rotating shaft 32, carries a skid disc 56 by means of an arrangement of bearings 58 and 60. The bearings 58 and 60 are mounted to the shaft as shown in the drawing with the bearing 58 butting up against the circumferential rib 54. The bearings 58 and 60 are spaced by means of a spacer 62 and are enclosed by means of a tubular collar 64. The skid disc is welded or bolted to the bottom of the collar at 65. Each skid disc 56 on the mower 10 prevents its associated cutting disc 14 from coming into contact with the ground and prevents "scalping" by controlling the height at which the cutting elements rotate above the ground. The discs 56 support the mower and reduce the load which the mounting means 18 would otherwise be required to carry. Each skid disc 56 has an upwardly curving lip 57 which serves to protect the cutting element 16 and prevent the ingress of dirt and debris into the internal workings of the cutting head. The skid discs 56, which are barely visible in FIG. 1, can rotate independently of the cutting discs 14 and because of this independent movement, are adapted to The arrangement of the drum cutting heads 13 provides the mower with an important advantage over conventional "slasher" types of machine. As shown in FIGS. 4 and 5 of the accompanying drawings, the upper surface of the cutting discs tends to support the mown material above the cutting plane of the rotating cutting elements. At the same time, the spinning action of the discs serves to throw the mown material away from the mower and hence minimises damage to the crop. Clearly, a rotating blade would not be able to operate in this manner.

Additionally, the shaft 32 has attached to it two radially extending vanes 33 which rotate as the shaft rotates to generate an outwardly directed airflow to assist in clearing the cutting heads of mown material and moving the material backwards away from the mower. The vanes 33 also help to prevent vegetation from becoming tangled around the shaft 32.

Figure 6:
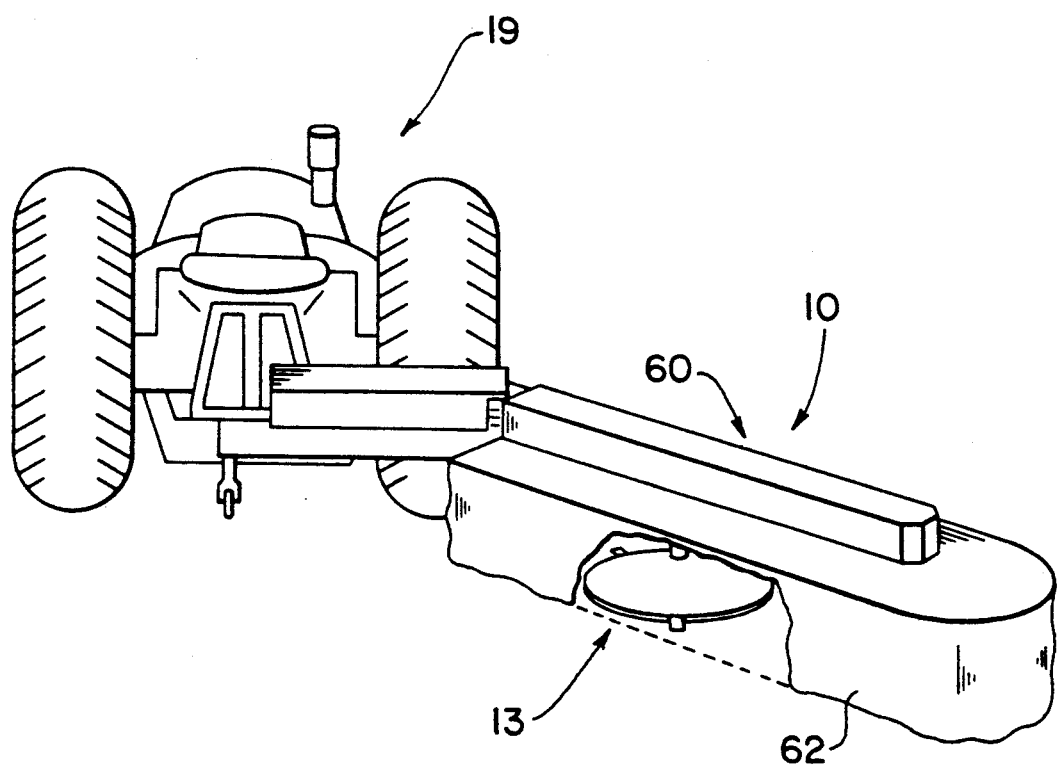
FIG. 6 shows a view similar to the view of the mover given in FIG. 1 but with a protective cover and curtain shown in place over the cutting heads.

The mower according to the invention could of course be used in many applications, but is ideally suited to cutting crops. It is also proposed that the mounting means 18 incorporate appropriate joint means to allow the arm 20 and associated cutting discs 14 to be rotated about the longitudinal axis of the tractor 19 so that the mower can be used to cut crops on steep embankments and the like. As shown in FIG. 6, a protective cover 60 and curtain 62 are also provided for the mower, but in the interests of clarity these has not been shown in the other Figures.

The invention provides a mower of simple design, which dispenses with the need for cutting disc synchronisation means, and yet which is effective to cut a complete swathe of material between adjacent cutting discs.

I claim:

1. A tractor-drawn mower for use in harvesting a crop comprising a frame, at least two rotatable cutting elements for cutting the crop mounted rotatably on the fame, the cutting elements having non-overlapping loci of cutting movement and being arranged on the mower to cut in use overlapping swathes of crop material, and the mower further comprising at least two cutting discs mounted rotatably on the mower frame with the cutting elements pivotally mounted on the cutting discs at the periphery of the cutting discs so that relative pivotal movement can take place between the cutting elements and the cutting discs.

2. A mower according to claim 1, wherein the cutting discs are non-synchronised cutting discs.

3. A mower according to claim 1, wherein the mower is a drum cutting mower comprising at least one drum cutting head with each cutting disc forming part of the at least one drum cutting head and having an associated skid disc mounted rotatably beneath each cutting disc for supporting the mower independent of auxiliary support means.

4. A mower according to claim 3, wherein three cutting heads are provided in a single row on the mower frame.

5. A mower according to claim 4, wherein the frame comprises a unitary box section arm on which each cutting disc is rotatably supported.

6. A mower according to claim 5, wherein the arm is adapted to be suspended from the hitching mount of the tractor and to extend therefrom in use to one side of the tractor so that the mower is not drawn through the crop in use directly behind the tractor.

7. A mower according to claim 6, wherein the cutting heads are spaced along the longitudinal axis of the box section arm.

8. A mower according to claim 7, wherein the unitary box section arm of the mower frame comprises hinge means so that the arm can be swung to an inoperative position where it is drawn directly behind the tractor, and an operative position in which the arm extends laterally of the tractor so that the cutting heads are drawn on an inclined substantially common axis through the crop thereby cutting overlapping swathes of crop material.

9. A mower according to claim 1, wherein the mower is provided with auxiliary power take-off means so that the mower can draw power from the tractor.

10. A mower according to claim 1, wherein the mower comprises drive means for rotating the cutting elements.

11. A mower according to claim 10, wherein the drive means comprises an arrangement of V-belts and pulleys.

12. A mower according to claim 1, wherein the at least two cutting discs are mounted on the mower frame by corresponding rotating shafts, the shafts carrying radially extending vanes which rotate as the shafts rotate to generate an outwardly directed air-flow to assist in clearing the cutting discs of mown material.

* * * * *